Patented Oct. 30, 1945

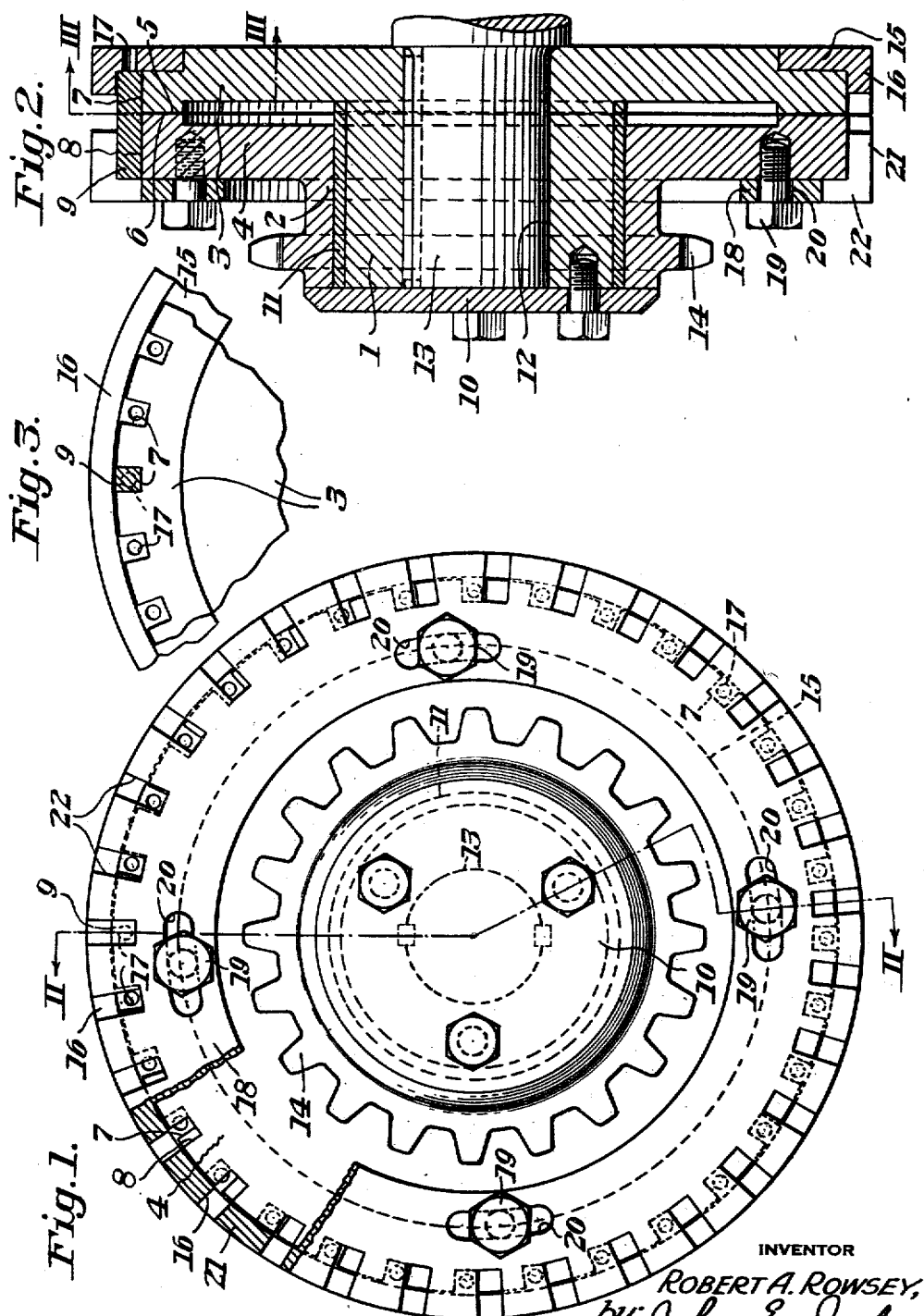

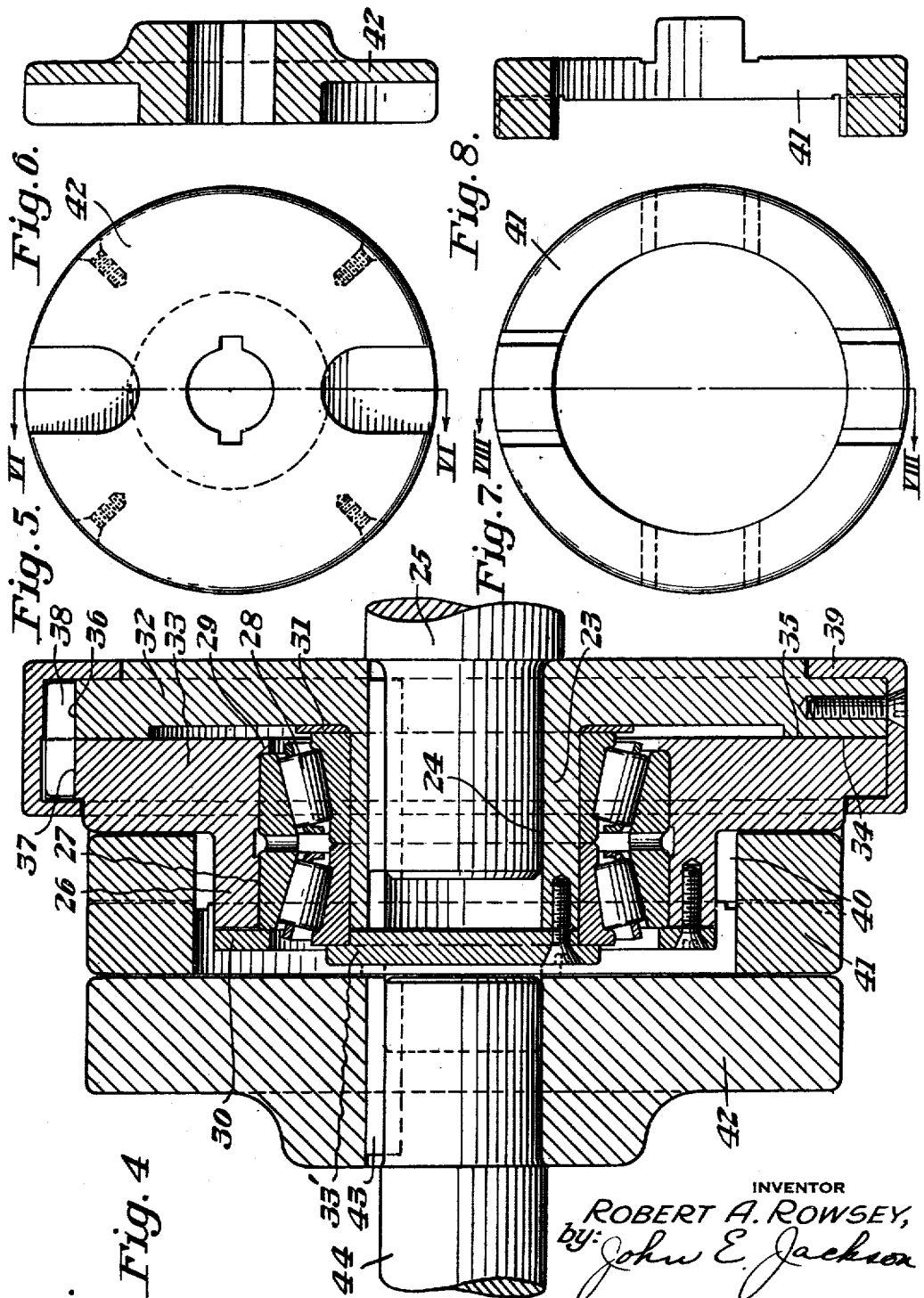

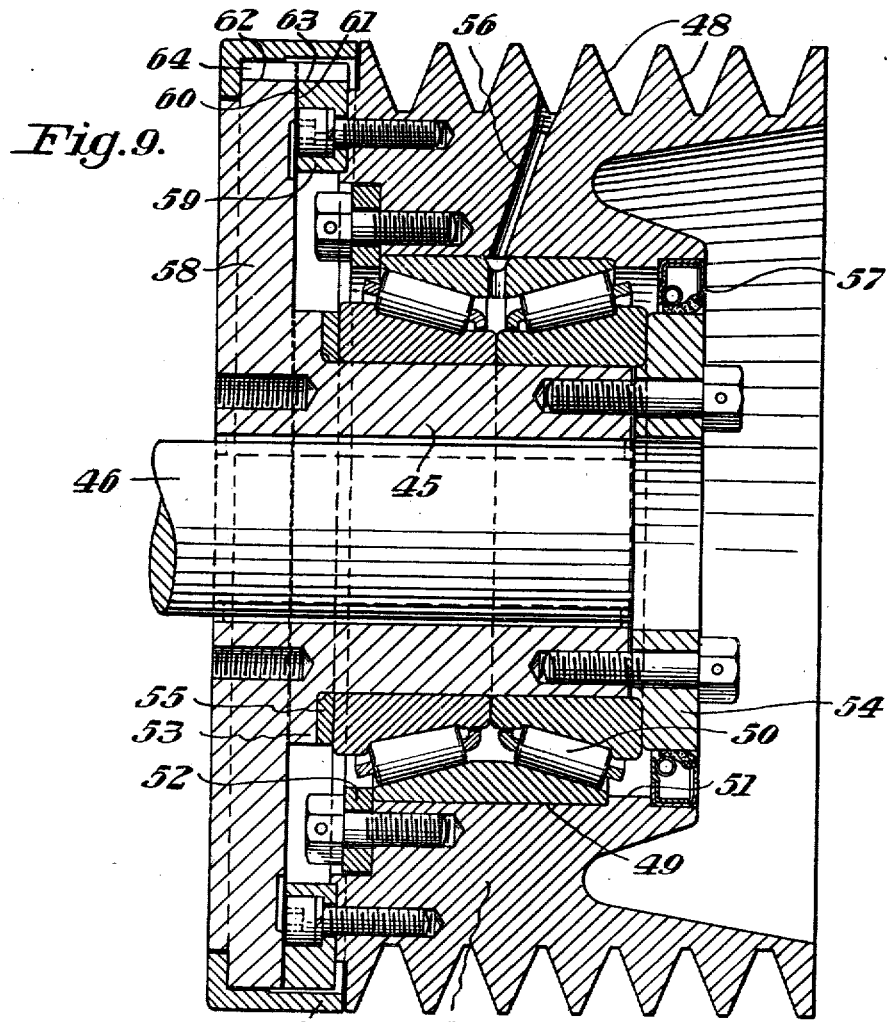
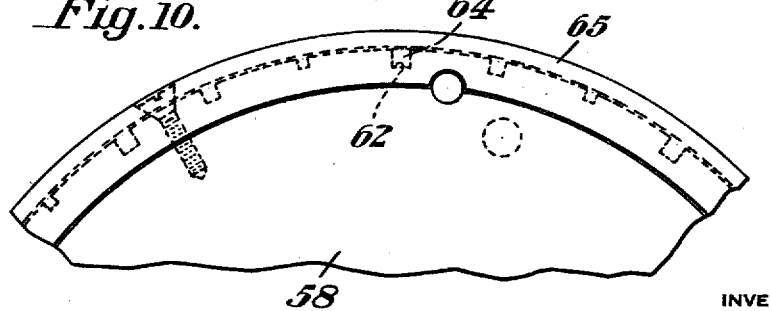

2,388,186

UNITED STATES PATENT OFFICE 2,388,186

ROTARY SHEAR PIN DRIVE

Robert A. Rowsey, Gary, Ind.

Application June 27, 1942, Serial No. 448,784

2 Claims. (Cl. 64—28)

This invention is a rotary shear pin drive which interrupts the transmission of rotary power when an exactly predeterminable overload occurs and can thereafter run freely for prolonged periods without damage, and which can be used with complete satisfaction under excentric loading conditions such as occur, for instance, when it is used in conjunction with a flexible coupling between misaligned shafts. Other advantages will become apparent from the following disclosure of specific examples of the invention illustrated by the accompanying drawings, the various figures being as follows:

Figure 1, a partially broken away end view;

Figure 2, a section from the line II—II in Figure 1;

Figure 3, a partial section from the line III—III in Figure 2;

Figure 4, a section similar to Figure 2 but showing a second example;

Figure 5, an end view of a part of Figure 4;

Figure 6, a section from the line VI—VI in Figure 5;

Figure 7, an end view of another part of Figure 5;

Figure 8, a section from the line VIII—VIII in Figure 7;

Figure 9, a section similar to Figures 2 and 4 but showing a third example; and

Figure 10, a partial end view of Figure 9.

More specifically, in the case of the first example the drive includes a journal 1 and a bearing 2 in coacting relation which are mutually rigid to radial and longitudinal motions and which respectively have rigid radial mounts 3 and 4 providing mutually opposed faces 5 and 6 in which registered shear pin sockets 7 and 8 are formed which are fitted with a shear pin 9. The faces 5 and 6 are machined precisely parallel and are so closely spaced while the sockets 7 and 8 encompass the pin 9 so closely that this pin works substantially entirely in pure shear without flexure, this meaning that the pin may be designed with an exactly predetermined strength in pure shear so as to cleanly shear and interrupt its rotary transmission of power upon an exactly predeterminable overload, it being impossible for the pin to be stressed in any other manner than pure shear. The close spacing between the faces 5 and 6 is maintained by a thrust bearing formed by a plate 10 screwed to the journal 1 with an overhanging flange bearing against the outer end of the bearing 2, the sliding areas being amply large for their purpose. The arrangement is such that the faces 5 and 6 cannot separate more than about .001 of an inch in the case of the drive illustrated, this being sufficiently close spacing in view of the other dimensions to relieve the pin 9 from all flexing stress, the pin and the sockets 7 and 8 being precision fits so that pin play is impossible.

Antifriction means in the form of a bearing liner 11 made of antifriction material, works between the journal 1 and the bearing 2 to form a heavy duty bearing assembly permitting prolonged free running upon shearing of the pin 9 due to the transmission of an overload through the drive. This means that the drive may be used at unattended places with complete safety, since there is no danger of a driving connection being reestablished after pin shearing even though the parts run free for a prolonged time. When running free the bearing thrust is diminished to a point eliminating the need for the use of antifriction means in conjunction with the thrust bearing when the drive is not of too great size.

It is to be understood that to provide the radial and longitudinal rigidity to the journal and bearing so as to preserve these characteristics at the shear pin location, the journal and bearing, including the thrust bearing, are a precision assembly. This is important since it permits the working of the pin 9 in pure shear without flexure regardless of excentric loading of either the journal 1 or the bearing 2, the entire device being a rigid, unitary drive entirely free from looseness in any direction until the shear pin 9 is sheared, the action on the shear pin being analogous to a precision bar or rod shear resulting in the pin 9 being cleanly cut as contrasted to being fractured. The cut faces of a sheared pin are smooth and entirely free from the crystalline appearance of a fractured pin. As explained, this effect prevails regardless of excentric loading of the drive because of the drive being a completely rigid unit with no single part movable in any direction capable of placing any load on the pin 9 other than pure shear.

With the foregoing in mind, the drive is shown as a part of a sprocket chain drive working a cantilever shaft driving a shear of a type intermittently loading this shaft so that it is intermittently loaded as a cantilever producing its deflection and eccentrically loading the described shear pin drive in a manner that is not ordinarily considered tolerable in the case of any prior art shear pin drive. More specifically, the journal 1 is provided with a bore 12 in which is keyed this cantilever shaft 13 while the outer periphery of the bearing 2 mounts the sprocket 14, the illustration showing the sprocket integral with the bearing since the illustrated drive was designed for this application. Regardless of deflection of the shaft 13, the drive is a unit and, therefore, deflects in its entirety as a unit without flexure of the pin 9, the latter remaining in pure shear while working. Obviously no tension can possibly be transmitted to the pin 9 nor can it be subjected to vibration fatigue, the interruption of the rotary drive depending solely on the pure shear strength of the pin 9. It is to be understood that the metallurgical and mechanical designing arts are perfectly capable of producing the shear pin 9 with an arcuately predetermined shear strength, but these arts cannot hope to predict shear pin failure when the pin is subjected to a combination of shear, flexure, tension, vibration fatigue, etc., as it is in the case of comparable prior art shear pin drives.

The mounts 3 and 4 take the form of circular discs with the sockets 7 and 8 used in multiple as slots which radially open outwardly, this permitting the drive to function as an indexing device by the removal and replacement of the shear pin in the sockets as required, but, at the same time, introducing the temptation to use more than one shear pin. This practice is entirely avoided by providing one of the mounts with an odd number of shear pin sockets and providing the other mount with an even number of shear pin sockets, this making it impossible to use more than one shear pin at a time and assuring the effectiveness of the drive for the purpose of enabling it to interrupt the transmission of power upon a predetermined overload. It is, of course, possible to use the same number of sockets for each of the mounts in the event it is desired to provide a drive that can meet varying conditions, since this will permit the use of more than one shear pin to adjust the load transmitting ability.

To definitely assure the desired shear action, the respective junctions between the faces 5 and 6 and the sockets 7 and 8 provide sharp cutting corners, the mounts providing the metal forming these corners and the bounding surfaces of the shear pin sockets being made of hardenable metal and being hardened in the manner of true shear knife elements, the shear pin 9 being preferably made of metal that is relatively softer than that described so that the shear pin sockets and their corners cannot wear out of shape and introduce looseness which would eliminate the effectiveness of the action described. Precise machining is necessary, it being necessary to cut the sockets in the mounts prior to their hardening, and to accurately grind them to precise size after hardening, the shear pins used being, of course, accurately ground to precise size to exactly fit the sockets. The exact shapes of the sockets and the shear pins are immaterial providing it is such as permits precision fitting of the shear pins in the sockets without looseness of any sort and without causing the transmission to the shear pin of any stress other than pure shear.

To prevent shear pin displacement during the operation of the drive, a ring 15 is permanently fixed to the periphery of the mount 3, this ring providing a flange 16 that overhangs the sockets 7 so as to radially close the same against shear pin displacement. This ring 15 is provided with holes 17 which register with the sockets 7 in axial alignment so that a shear pin driving tool may be used through these holes to dislodge a shear pin that might be jammed. This is desirable because the shear pins must fit the sockets with such precision as to possibly make shear pin removal difficult particularly after prolonged use of a pin. A second ring 18 is fixed to the periphery of the mount 4 by screws 19 working through arcuate slots 20 in this ring 18, the latter having a flange 21 that radially closes the sockets 8 in the periphery of the mount 4 against shear pin displacement and this flange having slots 22 which register with the sockets 8 when the ring 18 is turned upon loosening of the screws 19 whereby to both radially and longitudinally open the sockets 8 for shear pin removal. When the ring 18 is turned to close the slots 8, shear pin displacement is positively prevented, it being understood that the holes 17 in the ring 15 are smaller than the lateral dimensions of the pin. Since the rings 15 and 18 are entirely separated, they cannot possibly interconnect the two mounts either frictionally or otherwise, this adding to the precision of the device since all the load must be carried by the pin 9 in pure shear. At the same time, partial radial displacement of the shear pin is positively prevented so that it cannot recede from the axis of the drive to permit the shear pin to carry a greater load than that for which it was calculated.

Going now to the second example, a drive is shown incorporated with a flexible coupling interconnecting misaligned shafts, this application being one where the prior art shear pin drives cannot be applied because of the heavy eccentric loading applied the drive by the working of the flexible coupling necessary to accommodate the misalignment. In this example the journal 23 has a bore 24 and is keyed to one of the misaligned shafts 25, the cooperating bearing 26 having a bore 27 in which the outer races of tapered roller bearing assemblies 28 are tightly inserted, the inner races of these assemblies tightly encircling the journal 23. The arrangement follows precision tapered roller bearing arrangements, the bore 27 in the bearing 26 providing an inward flange 29 against which the outer race of the inside one of the assemblies 28 rigidly rests, the other outer race being rigidly held in the bore against the one resting against the flange 29 by a retainer ring 30 screwed to the outside end of the bearing 26; the inner race of the inside one of the assemblies resting against an annular ring 31 surrounding the journal 23 and bearing against its shear pin socket mount 32, which takes the form of a rigid circular plate like the plate 3 of the first example, while the inner race of the outside one of the assemblies 28 is rigidly held on the journal 23 against the first mentioned inner race by a retainer plate 33' screwed to the end of the journal 23. Assuming commercially obtainable precision tapered roller bearing assemblies are used, it is obvious that the journal 23 and the bearing 26 are completely rigid to both radial motion and longitudinal motion in any direction, while being extremely free to rotary motion, said assemblies providing a combined radial and thrust bearing.

As in the case of the first example, the mounts 32 and 33 provide opposed precisely ground parallel faces 34 and 35, respectively, each having a circumferential series of shear pin sockets 36 and 37 in which a shear pin 38 is fitted, the arrangements being exactly as described before regarding the necessity for precision fitting of the various parts. The ring 31 provides a means for positively spacing the faces 34 and 35 the distance found to most effectively assure precision shearing of the shear pin while permitting free running after the pin shears, .001 of an inch having been found satisfactory for this purpose in most instances. However, since the drive now being described can be made with extreme precision, this space can be still further reduced to a point where actual contact between the faces 34 and 35 almost, but not quite, occurs. A somewhat different arrangement prevents shear pin displacement in this instance, it consisting of a split ring 39 screwed to the outside of the mount 32 and fashioned to completely close the shear pin sockets. Such an arrangement is not so feasible in the case of prior art shear pin drives because in those instances shear pin breakages frequently occur regardless of an overload, whereas in the present instance the only way the shear pin can fail is by being placed in sufficient pure shear stress to cut cleanly through and this can only occur by reason of an overload.

The outside of the bearing 26 provides the dogs 40 which cooperate with the free dog plate 41 cooperating with the other dog plate 42 necessary to complete the flexible coupling, it being the dog plate 42 that is fixed by a key 43 to the other misaligned shaft 44. Regardless of lubrication, such a flexible coupling tends to eccentrically load the parts with which it is associated in a more or less unpredictable manner, this being immaterial in the case of the present shear pin drive because it constitutes a unitary assembly the individual parts of which are rigidly associated against all movements other than pure rotation which is restrained by the shear pin, whereby everything works as a unit.

Here again, the mounts 32 and 33 should be made of heat treated hardenable material, preferably steel, this particularly including the shear pin socket parts. The ring 31 should also be made of hardened material, such as heat treated steel, the use of this ring being advantageous since it permits grinding of the faces 34 and 35 to practice parallelism after heat treatment of the mounts, the ring 31 then being parallel ground to dimensions properly spacing these faces. Tapered roller bearing assemblies are inherently free of radial or longitudinal looseness caused by wear when installed in the manner disclosed, and, naturally, the drive may run free indefinitely after shearing of the pin 38 so that it is unnecessary to have an attendant watching the equipment it protects. In accordance with good machine practice, all parts subjected to deformation should be made of hardened metal. Naturally, the flexible coupling elements should also be hardened as by heat treating the proper grade of steel.

In the case of the third example, the journal 45 is keyed to a cantilever shaft 46, the bearing 47 constituting the pulley of a heavy-duty V-belt drive and having a series of circumferential grooves 48 for this purpose, the inside of the bearing 47 providing a bore 49 in which heavy-duty tapered roller bearing assemblies 50 are positioned. The outer races of these assemblies rigidly rest against an inward flange 51 at the end of the bearing bore 49, the holding force being provided by a retainer ring 52 rigidly screwed to the other end of the bearing, the inner races being forced against an outward flange 53 at the inside end of the journal 45 by a retainer plate 54 screwed to the other end of the journal, with a hardened ring 55 interposed between the inner bearing races and the flange 53, this ring 55 being ground to properly space the parts as described in the case of the ring 31 in the second example. A further refinement is the use of a lubricating duct 56 leading from the outside of the bearing where it is plugged by a suitable flush screw which can be removed for substitution by an industrial grease fitting, to the inside of the bore 49 to the heavy duty tapered roller bearing assemblies, a lubricant seal 57 between the outer ends of the journal and the bearing preventing lubricant loss. These refinements are necessary because the drive now being disclosed is intended for extremely heavy duty.

In the case of the other two examples, the shear pin socket mounts are integral parts of the journal and bearing respectively. This requires them being made of hardenable material and their being heat treated throughout, a practice that becomes rather expensive in the case of a large part such as is involved by the bearing of the third example. Therefore, in this instance, the mount 58 which rigidly extends radially from the journal 45 constitutes a flat circular hardened plate that is a part of the journal end, but the other mount 59 that is rigidly carried by the bearing 47 takes the form of an annular hardened plate that is rigidly screwed to the journal end, so that only the shear part 59 need be heat treated, these plates providing the ground parallel finished faces 60 and 61, and the shear pin sockets 62 and 63 which carry the shear pin 64. The shear pin retainer takes the form of an inwardly flanged cylindrical ring 65 that is axially fitted and screwed into place, this ring being solid. It is to be understood that here again the faces 60 and 61 should be ground precisely parallel with a separation not greatly exceeding .001 of an inch, while the shear pin sockets and the pin itself are ground to precision fits, all for reasons already described. Also, the shear pin sockets 62 and 63 are formed as circumferential series about the outer edges of the two mounts formed by the plates 58 and 59, but in this instance the sockets are made with different sizes to accommodate shear pins having different dimensions, whereby the load transmitting ability of the device may be varied. Since the shear pin works in pure shear, it may have extremely small dimensions while carrying a relatively heavy load, it being remembered that the pin is not called upon to work as a beam or as a tensioned device. In all events, the dimensions of the shear pin depend upon the shearing action exerted by the true, sharp shearing parts of the drive, this action being increased when the drive must carry shock loads and being materially decreased in the case of steady loads. Furthermore, in all instances a smaller pin may be used than in prior art devices, since it is relieved of all loading excepting pure shear.

This is a continuation-in-part of my copending application filed April 10, 1940, and bearing Serial No. 328,979.

I claim:

1. A rotary power drive including spaced coaxial rotary plates with at least one shear pin socket in each of their peripheral portions and a shear pin in said sockets and coupling said plates, the latter being positively spaced closely together and providing clean cutting shearing surfaces for said pin, said sockets comprising radially open recesses in the peripheries of said plates with one of said plates provided with a permanent part radially closing its said slot and having an opening registering with the end of said pin for insertion of a driving tool, the other of said plates having a closure for radially closing its said slot which can be opened to permit removal of said pin.

2. A rotary power drive comprising a first rotary plate of circular contour having a hollow shaft for keying to a shaft passed therethrough, a second rotary plate of circular contour having the same diameter as that of said first plate and journaled on said hollow shaft for free rotation, means for positively holding the opposed faces of said plates in closely spaced relation, a plurality of radially open slots formed in the peripheries of said plates parallel the axes of the latter, at least one shear pin inserted in registered ones of said slots of the respective plates, a permanent radial closure for the slots on one of said plates with holes registered with said slots for passage of a shear pin driving tool to permit said pin being driven longitudinally to effect its removal, a rotary member for radially closing the slots of the other of said plates and for closing the ends thereof remote from the other of said plates and having openings that register with said slots by rotating said member so said shear pin can be radially or longitudinally removed from its slot, releasable means for fixing said member against rotation respecting the plate having the slots closed thereby and means effecting rotary power connection with said second plate.

ROBERT A. ROWSEY.

CERTIFICATE OF CORRECTION.

Patent No. 2,388,186.  October 30, 1945.

ROBERT A. ROWSEY.

It is hereby certified that error appears in the printed specification of the above numbered patent requiring correction as follows: Page 2, first column, line 15, for "arcuately" read --accurately--; page 3, first column, line 43-44, for "practice" read --precise--; and that the said Letters Patent should be read with this correction therein that the same may conform to the record of the case in the Patent Office.

Signed and sealed this 12th day of February, A. D. 1946.

Leslie Frazer (Seal)  First Assistant Commissioner of Patents.

ing a closure for radially closing its said slot which can be opened to permit removal of said pin.

2. A rotary power drive comprising a first rotary plate of circular contour having a hollow shaft for keying to a shaft passed therethrough, a second rotary plate of circular contour having the same diameter as that of said first plate and journaled on said hollow shaft for free rotation, means for positively holding the opposed faces of said plates in closely spaced relation, a plurality of radially open slots formed in the peripheries of said plates parallel the axes of the latter, at least one shear pin inserted in registered ones of said slots of the respective plates, a permanent radial closure for the slots on one of said plates with holes registered with said slots for passage of a shear pin driving tool to permit said pin being driven longitudinally to effect its removal, a rotary member for radially closing the slots of the other of said plates and for closing the ends thereof remote from the other of said plates and having openings that register with said slots by rotating said member so said shear pin can be radially or longitudinally removed from its slot, releasable means for fixing said member against rotation respecting the plate having the slots closed thereby and means effecting rotary power connection with said second plate.

ROBERT A. ROWSEY.

CERTIFICATE OF CORRECTION.

Patent No. 2,388,186. October 30, 1945.

ROBERT A. ROWSEY.

It is hereby certified that error appears in the printed specification of the above numbered patent requiring correction as follows: Page 2, first column, line 15, for "arcuately" read --accurately--; page 3, first column, line 43-44, for "practice" read --precise--; and that the said Letters Patent should be read with this correction therein that the same may conform to the record of the case in the Patent Office.

Signed and sealed this 12th day of February, A. D. 1946.

Leslie Frazer (Seal)　　　　　　　　　　First Assistant Commissioner of Patents.